(12) United States Patent
Van Blokland

(10) Patent No.: US 8,961,165 B2
(45) Date of Patent: Feb. 24, 2015

(54) DOUGH PIECE ROLLED UP WITH A SEPARATOR SHEET, AND METHOD AND DEVICE FOR PREPARING THESE

(75) Inventor: Johannes Josephus Antonius Van Blokland, Beusichem (NL)

(73) Assignee: Rademaker B.V., Culemborg (NL)

( * ) Notice: Subject to any disclaimer, the term of this patent is extended or adjusted under 35 U.S.C. 154(b) by 128 days.

(21) Appl. No.: 13/483,445

(22) Filed: May 30, 2012

(65) Prior Publication Data

US 2012/0308693 A1 Dec. 6, 2012

(30) Foreign Application Priority Data

Jun. 1, 2011 (EP) .................................. 11168508

(51) Int. Cl.
*A21D 10/02* (2006.01)
*A21D 6/00* (2006.01)
*A21C 3/06* (2006.01)

(52) U.S. Cl.
CPC ........................................ *A21C 3/06* (2013.01)
USPC ........... 425/319; 425/371; 425/373; 425/391; 425/335; 425/322

(58) Field of Classification Search
CPC ............. A21C 3/06; A21C 3/065; A21C 3/10
USPC ......... 425/319, 320, 321, 335, 322, 371, 373, 425/391
See application file for complete search history.

(56) References Cited

U.S. PATENT DOCUMENTS

| | | | | |
|---|---|---|---|---|
| 1,966,147 A | * | 7/1934 | Steere | 425/241 |
| 2,629,501 A | * | 2/1953 | Curioni | 414/21 |
| 3,012,923 A | * | 12/1961 | Slayter | 156/62.2 |
| 3,225,717 A | | 12/1965 | Page | |
| 3,901,137 A | * | 8/1975 | Jimenez | 99/353 |
| 4,313,719 A | * | 2/1982 | Lundgren | 425/335 |
| 4,608,919 A | | 9/1986 | Prows et al. | |
| 4,996,915 A | * | 3/1991 | Morikawa et al. | 99/450.2 |
| 5,281,120 A | | 1/1994 | Morikawa et al. | |
| 5,382,154 A | * | 1/1995 | Morikawa et al. | 425/321 |
| 5,421,714 A | * | 6/1995 | Morikawa et al. | 425/321 |
| 5,516,542 A | | 5/1996 | Zimmermann et al. | |
| 5,609,094 A | * | 3/1997 | Ueno et al. | 99/450.2 |
| 5,655,439 A | * | 8/1997 | Ueno et al. | 99/450.2 |

(Continued)

FOREIGN PATENT DOCUMENTS

| | | |
|---|---|---|
| DE | 4402346 A1 | 8/1995 |
| EP | 0204490 A1 | 12/1986 |

(Continued)

*Primary Examiner* — Matthew Daniels
*Assistant Examiner* — Nahida Sultana
(74) *Attorney, Agent, or Firm* — The Webb Law Firm

(57) ABSTRACT

The present invention leads to a method for preparing a dough piece rolled up with separator sheet, comprising supplying in a transport direction, a dough piece positioned on a separator sheet, the dough piece and the separator sheet having a length and a width, wherein a leading edge of the separator sheet exceeds the dough piece at least a first side, rolling up the at least one side of the dough paper that exceeds the dough piece, thus forming a cylinder of separator sheet, extending in a width direction of the dough piece and rolling up the rest of the separator sheet with the dough piece around the cylinder. The invention further relates to a device for performing the method and a roll formed by the method and/or device.

7 Claims, 2 Drawing Sheets

(56) References Cited

U.S. PATENT DOCUMENTS

| | | | |
|---|---|---|---|
| 6,165,522 A * | 12/2000 | Lira | 426/94 |
| 6,838,105 B2 * | 1/2005 | Finkowski et al. | 426/496 |
| 2003/0228388 A1 * | 12/2003 | Hayashi et al. | 425/363 |
| 2008/0160123 A1 * | 7/2008 | Spiers et al. | 425/111 |
| 2012/0266902 A1 * | 10/2012 | Drezen et al. | 131/284 |

FOREIGN PATENT DOCUMENTS

| | | | |
|---|---|---|---|
| EP | 0213088 | A1 | 3/1987 |
| EP | 0230335 | A2 | 7/1987 |
| EP | 0551177 | A1 | 7/1993 |
| GB | 941153 | * | 11/1963 |
| GB | 1541457 | | 2/1979 |

\* cited by examiner

DOUGH PIECE ROLLED UP WITH A SEPARATOR SHEET, AND METHOD AND DEVICE FOR PREPARING THESE

BACKGROUND OF THE INVENTION

1) Field of the Invention

The present invention relates to a dough piece rolled up with separator sheet, and a method and device for preparing these.

2) Discussion of the Prior Art

Dough pieces rolled up with a separator sheet (for instance bakery paper or a foil) are used as a basis for home made pizzas and like products. A roll of a dough piece in a separator sheet is a compact way of storing, packaging and selling the dough, and it has the advantage that the dough is covered with paper on both sides, so that it does not stick together and stays fresh longer than a flat dough piece with only one paper, or even without paper. In order to use the prepared product, the paper is unrolled, and—in case of a pizza—provided with a topping, to be baked on the separator sheet afterwards. When a foil is used, the dough may be baked without the separator sheet.

Dough pieces rolled up with separator sheet are known in general, and so are methods and devices to prepare them. One example according to the art uses a discontinued process, in which a conveyor with dough pieces is stopped from time to time, to roll dough pieces and baking paper in a direction perpendicular to their direction of conveyance. This method has the disadvantage to be slow, and furthermore, there is a risk that the dough pieces rolled up with a separator sheet unroll after being released from the location where they are rolled.

A method for rolling dough pieces continuously is known from the European patent EP 0 204 490. Herein, a roll of dough is made by feeding a dough piece between two conveyors that are operated in opposite directions is proposed. However, this method is not suitable for rolling dough on a separator sheet, since the paper tends to move straight on instead of rolling up.

It is a goal of the present invention to propose a method and device for rolling up a dough piece that lacks the aforementioned disadvantages, and to propose an improved dough piece rolled up with a separator sheet.

SUMMARY OF THE INVENTION

The invention thereto proposes a method for supplying a dough piece rolled up with a separator sheet, comprising the steps of supplying in a transport direction, a dough piece positioned on a separator sheet, the dough piece and the separator sheet having a length and a width, wherein a leading edge of the separator sheet exceeds the dough piece at least a first side, rolling up the at least one side of the dough paper that exceeds the dough piece, thus forming a cylinder of separator sheet, extending in a width direction of the dough piece, and rolling up the rest of the separator sheet with the dough piece around the cylinder.

By forming a cylinder of separator sheet first has several advantages. Firstly, when cutting the paper in pieces, straight edges are formed. These edges simplify the formation of a straight roll, which is advantageous when mechanically handling the rolled dough. As a result, the invention thus provides with the possibility to roll up dough pieces with various forms, e.g. square, rectangular, triangular, round, hexagonal, etc.

In comparison with the state of the art, wherein a strip of the leading edge of the separator sheet is fold over the dough piece prior to rolling, the not necessarily straight leading edge of the dough piece lead to obliquely rolled dough pieces.

A further advantage is that the initially formed paper roll provides the final result a desired flexural strength. During production, this flexural strength already offers the advantage that no additional support is required. Such a support may normally be formed by one or more cylindrical parts that are retracted coaxially with the roll after the latter had been rolled up. However, coaxial retraction of such parts requires an extra handling step, and it also requires more width in production environment, which are both considered disadvantageous.

The leading edge of the separator sheet needs to exceed the dough piece at least such an amount, that at least one turn can be made. When more sturdiness is required, two or more turns may be made. For a dough roll with a diameter of 1 cm, this means that about 3 to 6 cm of leading paper is required (dependent on the number of turns).

In a preferred embodiment, the method according to the invention further comprises supplying a dough piece on a separator sheet, wherein the separator sheet also exceeds the dough piece at a second side, opposite to the first side, and providing a strip or a number of dots of adhesive along the second side, and fixing the rolled up dough piece and separator sheet by means of the strip or dots of adhesive.

The fixation of a lagging side of the dough paper on the roll thus formed, prevents unrolling of the roll during further handling or processing of the roll, which further guarantees the freshness of the dough to an end user thereof.

Methods according to the art for forming rolled dough have proven to be unsuitable for handling dough on paper. Paper behaves differently from dough, due to its different weight, stiffness, thickness and adhesion. Where dough can be fold and rolled by means of two endless conveyors, as shown in the above mentioned European patent, paper tends to continue its path straight on with such a configuration.

According to the invention, rolling the dough and the separator sheet is performed by means of at least three conveyors, each turning the at least one dough piece on separator sheet essentially 90 degrees with respect to the transport direction of the dough. The conveyors form a rolling chamber that forces the paper to turn three quarters round, to encounter itself and to form a roll.

A further advantage is that the roll is formed during transport of the separator sheet and the dough piece. Since the axis of rotation of the dough piece is perpendicular to the transport direction of the separator sheet with the dough piece, the method is suitable for uninterruptedly handling a plurality of dough pieces, uninterruptedly meaning here that the transport of separator sheet with dough pieces does not require to be stopped during rolling, which makes the manufacturing process faster. The method according to the invention therefor also comprises uninterruptedly supplying, rolling and carrying off a multiple dough pieces in the transport direction.

The invention further relates to a device for manufacturing a dough piece rolled up with separator sheet, comprising a supplier for supplying in a transport direction of dough pieces on separator sheet, the dough pieces having a length in the transport direction of and a width perpendicular to the transport direction, a rolling chamber, contiguous to the supplier in the transport direction, defined by at least a subsequent first, a second and a third endless conveyor, each having a direction of conveyance perpendicular to the direction of conveyance of a previous conveyor, and the transport direction respectively, and together configured for leading an item supplied to the rolling chamber around, such that it encounters itself again.

As explained above, the leading strip of paper puts different requirements to a device for forming the rolls. Compared with the state of the art, it has appeared that means are required to force the paper three quarters round, while when making a roll of only dough, due to gravity and adhering forces, the dough is easily turned, and falls back on itself without external interaction.

In the present invention, this problem is overcome by providing at least three endless conveyors, each having a direction of conveyance perpendicular to the direction of conveyance of a previous conveyor. With "direction of conveyance", reference is made here to the surface direction of the endless conveyor at the point where it encounters the separator sheet and later on the separator sheet with the dough piece.

For clarity reasons, in the following, the length of the dough is in the transport direction, and the width perpendicular thereto. The transport takes place essentially in a horizontal plane, although this may be inclined, and in particular be sloped towards the rolling chamber defined by the at least three endless conveyors. In practice, a slope of 20 to 45 degrees, and in particular about 30 degrees may be applied. The width of the dough is in the same horizontal plane, perpendicular to the length.

An endless conveyor can have an essentially annular outline, such as a wheel, or a cylinder, or it may be formed by means of a string or a band or belt. In an embodiment, the first endless transporter comprises a number of wheels, arranged mutually spaced in a width direction, and rotatable on a common axis of rotation in a width direction.

The wheels are arranged movable in a direction perpendicular to the transport direction and the width of the dough. This direction will be referred to as the height direction, although it may be inclined when the transport direction is sloping with respect to the horizontal. The choice for a number of wheels instead of—for example one cylinder—is especially advantageous when the second endless conveyor comprises a number of endless strings or belts, arranged mutually spaced in a width direction, at positions that fall in between the positions of the wheels. The endless strings are then led through the recesses between the wheels. This way, a "closed" chamber can be made, where the paper cannot escape between two conveyors.

Accordingly, the third transporter may comprise a number of endless strings or belts, arranged mutually spaced in a width direction, at positions that fall in between the positions of the endless strings or belts of the second conveyor. Again, the endless strings or belts of the third conveyor may be led through the open spaces between the belts or strings of the second converter.

The supplier may in general comprise an endless belt, which may in particular be equipped with a perforated cylinder, wherein along at least at a part of the mantle of the cylinder, a vacuum is applicable, and wherein at an edge of the part in a downstream transport direction, a scraper is provided, for scraping the leading edge of the paper from the perforated cylinder.

Such a cylinder is placed at the end of the supplier, preceded by means for forming separate dough pieces on separated sheets of separator sheet. The vacuum can be applied to stick the paper to the roll, for leasing it to the first conveyor in a controlled manner.

When rolling up separator sheet with dough pieces, the diameter of the roll increases. For allowing this increase to take place, the mutual position of at least two of the conveyors is preferably displaceable, so that the rolling chamber increases along during rolling up a dough piece with separator sheet. This increase may be done in a controlled manner, based on a predetermined or precalculated increase of the roll, so that the chamber does not limit the dough while being rolled.

The supplier may be configured such that it provides dough pieces positioned on separator sheets, with the leading edge of the separator sheet exceeds the dough piece at the first side such that it can be rolled at least one turn, before the dough piece reaches the rolling chamber. The device may further comprise an adhesive-dispenser, for dispensing adhesive on an exceeding edge of the baking paper lagging the dough piece in a transport direction.

The invention also relates to a dough piece rolled up with separator sheet, comprising a cylinder of separator sheet, along which dough piece with the separator sheet is wound further. In an embodiment, the cylinder of separator sheet forms one piece with the separator sheet of which the roll is further made. The edge of the separator sheet at the outside of the roll may herein be fixed to the roll by means of an adhesive.

BRIEF DESCRIPTION OF THE DRAWINGS

The invention will now be elucidated into more detail with reference to the following figures. Herein.

DETAILED DESCRIPTION OF THE PREFERRED EMBODIMENTS

Figure 1:
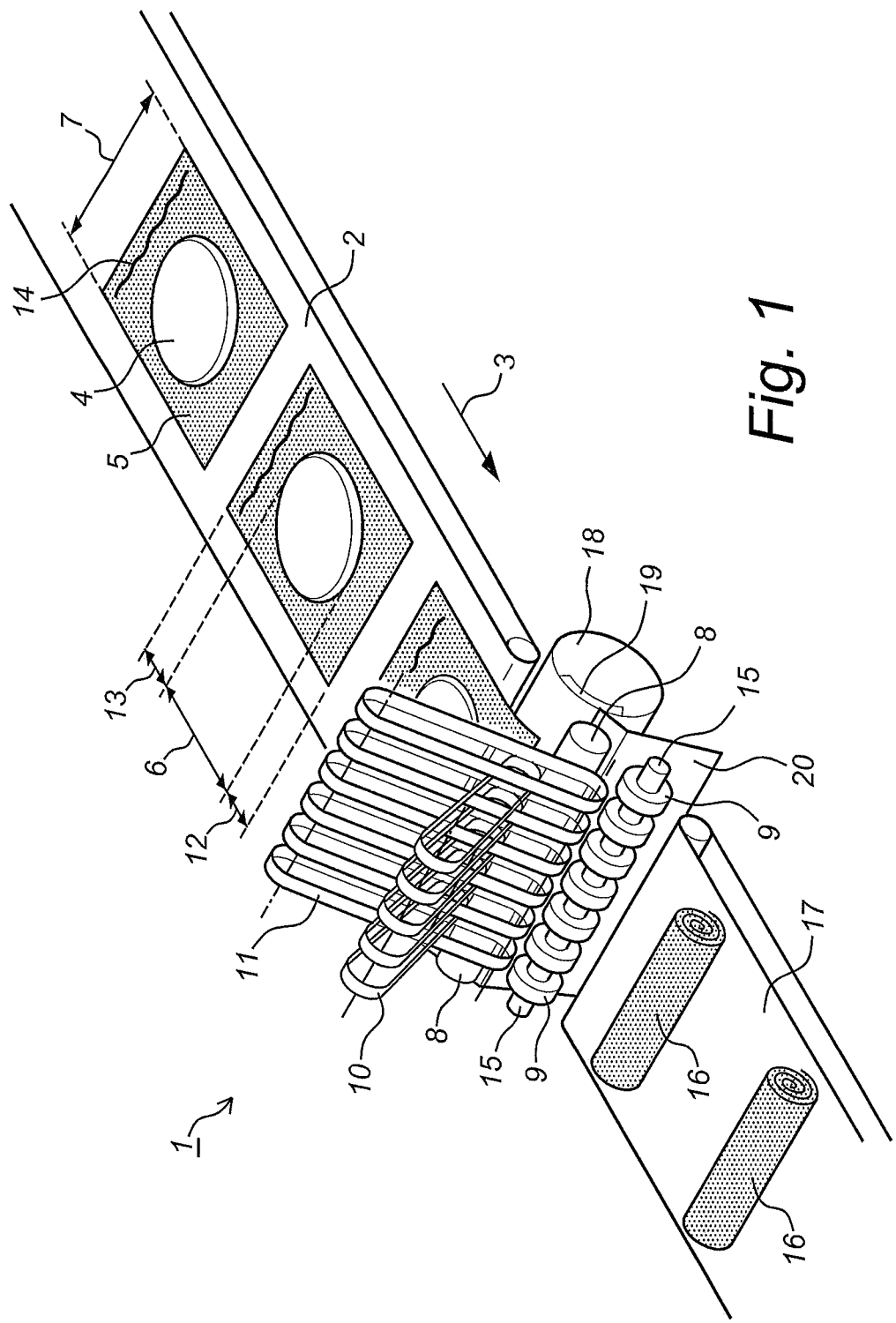
FIG. 1 shows a schematic perspective view of a device according to the invention.

FIG. 1 shows a device 1 for preparing a dough piece rolled up with separator sheet, comprising a supplier 2 for supplying in a transport direction 3 of dough pieces 4 on separator sheet 5, the dough pieces 4 having a length 6 in the transport direction and a width 7 perpendicular to the transport direction. The device 1 comprises a rolling chamber 8, contiguous to the supplier 2 in the transport direction, defined by at least a subsequent first conveyor 9, a second conveyor 10, and a third endless conveyor 11. The interaction of the first, second and third conveyor will be explained later on into more detail in the next figure. In FIG. 1 it is visible that the separator sheets 5 extend the length of the dough pieces 4 at their leading edges, with respect to the direction of movement 3. The extending strip 12 of separator sheet is first led into the rolling chamber, to form a paper roll. Afterwards the dough is rolled along, and finally, a lagging stroke 13 of the separator sheet is rolled up. In order to fix the thus formed roll, the lagging stroke 13 is provided with adhesive 14, which may be applied in a strip or in separate dots.

In FIG. 1, it is envisioned that the first endless conveyor 9 comprises a number of wheels, arranged mutually spaced in a width direction, and rotatable on a common axis of rotation 15 in a width direction. The second endless conveyor 10 comprises a number of endless strings or belts, arranged mutually spaced in a width direction, at positions that fall in between the positions of the wheels of the first endless conveyor 9, and the third transporter 11 comprises a number of endless strings or belts, arranged mutually spaced in a width direction, at positions that fall in between the positions of the endless strings or belts of the second conveyor 10. This way, in motion, a chamber is formed, with "moving walls" that curl up the separator sheet to a cylinder. After being curled up, the rolls 16 of separator sheets 4 with dough pieces 6 are fed away by a transporter 17.

Figure 2:
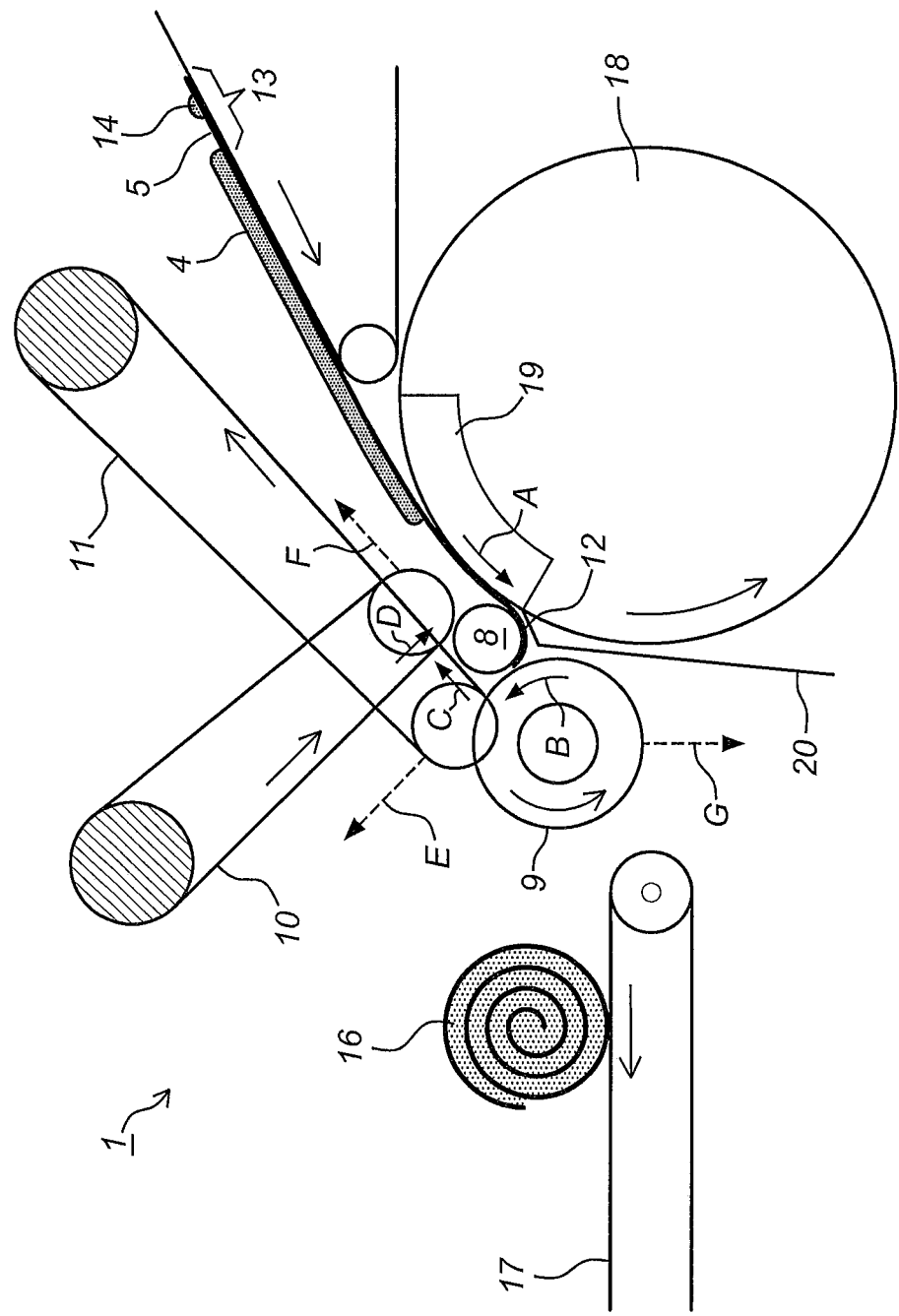
FIG. 2 shows a detailed side view of a device according to the invention.

FIG. 2 shows a detailed side view of the device 1 from FIG. 1. In FIG. 2 it is visible, that a leading strip 12 of the separator sheet 5, encounters three endless conveyors 9, 10, 11, each having a direction of conveyance B, C, D perpendicular to the direction of conveyance of a previous conveyor, and the transport direction A respectively, and together configured for leading an item supplied to the rolling chamber around, such that it encounters itself again.

It is also envisioned that the working surfaces of the conveyors 9, 10, 11, being the locations where interaction with the separator sheet (and indirectly the dough) takes place, have intersecting planes, and thus form a closed chamber. This is the reason that the first endless conveyor 9 is formed by a number of wheels (which may be provided with rubber or the like for increasing friction, and the second endless conveyor 10 comprises a number of endless strings or belts, arranged mutually spaced in a width direction, at positions that fall in between the positions of the wheels of the first conveyor 9. The third conveyor 11 comprises a number of endless strings or belts, arranged mutually spaced in a width direction, at positions that fall in between the positions of the endless strings or belts of the second conveyor 10.

During the rolling of a separator sheet 5 with a dough piece 4, the second conveyor 10 is moved in the direction E, and the third conveyor 11 is moved in the direction F, in order to increase the volume of the rolling chamber 8.

The supplier 2 comprises a perforated cylinder 18, wherein along at least at a part 19 of the mantle of the cylinder, a vacuum is applicable, and wherein at an edge of the part in a downstream transport direction, a scraper 20 is provided, for scraping the leading edge of the paper from the perforated cylinder 18.

When a roll 16 is finished within the rolling chamber, the first conveyor 9 is moved in the direction G, for opening the chamber and transferring the roll to a transporter 17. Afterwards, all conveyors are brought back to their initial positions for starting a new cyclus.

The device finally comprises a (not depicted) adhesive-dispenser, for dispensing adhesive 14 on an exceeding edge of the baking paper lagging the dough piece in a transport direction.

The invention claimed is:

1. A device for preparing a dough piece rolled up with separator sheet, comprising:
    a supplier for supplying in a transport direction of dough pieces on separator sheet, the dough pieces having a length in the transport direction of and a width perpendicular to the transport direction;
    a rolling chamber, contiguous to the supplier in the transport direction, defined by at least a subsequent first, a second and a third endless conveyor, each having a direction of conveyance perpendicular to the direction of conveyance of a previous conveyor, and the transport direction respectively, and together configured for leading an item supplied to the rolling chamber around, such that it encounters itself again,
    wherein the supplier comprises a perforated cylinder, wherein along at least at a part of the mantle of the cylinder, a vacuum is applicable, and wherein at an edge of the part in a downstream transport direction, a scraper is provided, for scraping a leading edge of the separator sheet from the perforated cylinder.

2. The device according to claim 1, wherein the first endless transporter comprises a number of wheels, arranged mutually spaced in a width direction, and rotatable on a common axis of rotation in a width direction.

3. The device according to claim 2, wherein the second endless conveyor comprises a number of endless strings or belts, arranged mutually spaced in a width direction, at positions that fall in between the positions of the wheels.

4. The device according to claim 3, wherein the third transporter comprises a number of endless strings or belts, arranged mutually spaced in a width direction, at positions that fall in between the positions of the endless strings or belts of the second conveyor.

5. The device according to claim 1, wherein the mutual position of at least two of the conveyors is displaceable, for increasing the size of the rolling chamber during rolling up a dough piece with separator sheet, in correspondence with a predetermined growth of the roll.

6. The device according to claim 1, wherein the supplier is configured such that it provides dough pieces positioned on separator sheets, with the leading edge of the separator sheet exceeds the dough piece at the first side such that it can be rolled at least one turn, before the dough piece reaches the rolling chamber.

7. The device according to claim 1, comprising an adhesive-dispenser, for dispensing adhesive on an exceeding edge of the separator sheet lagging the dough piece in a transport direction.

* * * * *